June 9, 1931. K. FARRAR 1,809,550

HOSE HOLDER

Filed Sept. 29, 1930

Inventor
*Kilby Farrar*
By H. S. McDowell
Attorney

Patented June 9, 1931

1,809,550

UNITED STATES PATENT OFFICE

KILBY FARRAR, OF LONDON, OHIO

HOSE HOLDER

Application filed September 29, 1930. Serial No. 485,130.

This invention relates to hose holders such as are used to support the nozzle of a lawn or garden hose to hold the same off the ground and in a desired direction to water the lawn.

The principal object of the present invention resides in the provision of a hose support or holder which is simple, inexpensive and easily handled and which is adapted to stand on the lawn with the hose or the nozzle thereof attached to the holder and to be capable of supporting the nozzle end of the hose in a vertical position as well as in angular positions.

It is also an object of the invention to provide a hose support which is of such design and construction that it will be braced in all directions and prevented from falling or changing its position due to water pressure.

With these and other objects in view, which will appear as the description proceeds, the invention consists in the novel features of construction, combinations of elements and arrangements of parts hereinafter to be more fully described and pointed out in the appended claims.

Figure 1:
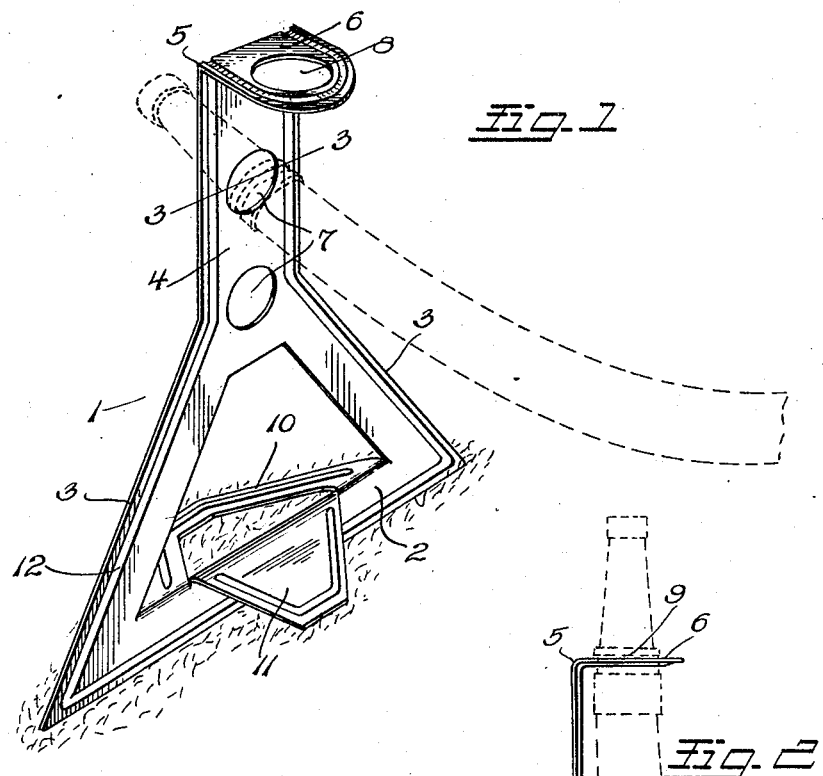
Figure 3:
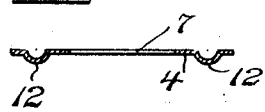
Figure 2:
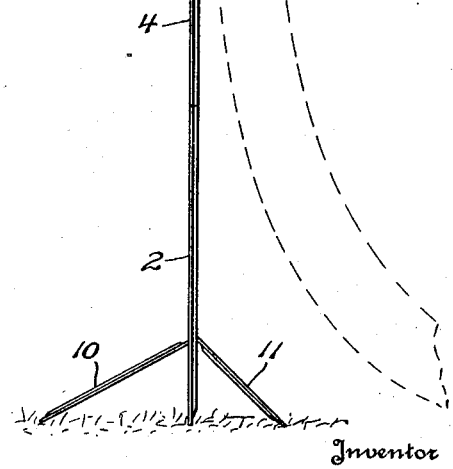

In the accompanying drawings:

Figure 1 is a perspective view of the hose holder comprising the present invention showing the same in use, Figure 2 is an edge elevation thereof, and Figure 3 is a horizontal sectional view taken on the line 3—3 of Figure 1.

Referring more particularly to the drawings, the numeral 1 designates the hose holder or support in its entirety and which may be made of galvanized sheet metal, or other rust-proof material, of sufficient thickness to give rigidity to the structure. Preferably the holder is stamped out of a single piece of material and is formed to include a substantially triangular base section 2, which has its upwardly directed side edges 3 merging into a comparatively narrow section 4. The section 4, which is arranged in the same plane as that of the base section 2, has its upper end bent as at 5 to form a horizontally disposed shelf portion 6 arranged in a direction at right angles to the section 4.

Provided in the central portion 4 is a plurality of apertures 7 which are preferably of a circular formation and arranged one above the other in the vertical median line of the support. Also formed in the shelf portion 6 is a similar aperture 8 which, due to the relative positions of the sections 4 and 6, is arranged at right angles to the apertures 7. The apertures 7 and 8 are adapted to receive the nozzle of a hose and are slightly larger than the cross-sectional area of the nozzle so that the nozzle may be easily inserted within the apertures to form a binding relation with the nozzle and prevent accidental withdrawal thereof. This binding relation is effected by the angular position the nozzle assumes with respect to the opening due to the weight and resiliency of the hose.

When it is desired to sprinkle a portion of the lawn adjacent the holder, the nozzle is inserted in the lowermost of the apertures 7. When it is desired to throw a stream of water a greater distance away from the holder, the nozzle of the hose is placed in the upper aperture 7. Again, if it is desired to sprinkle the lawn in all directions from the holder or a limited portion thereof, the nozzle is then inserted into the aperture 8, as indicated by dotted lines in Figure 2. In this case the aperture 8 may be slightly larger than the apertures 7 so that the nozzle may be inserted beyond the adjusting nut of the nozzle, so that the shoulder 9 thereof may engage with the marginal edges of the opening or aperture holding the nozzle in place therein yet permitting of the adjustment of the nozzle to vary the spray thereof.

To support the holder in its upright position and to prevent the same from falling when the hose is inserted through the apertures, the base section 2 may have its inner portion struck out to form a leg 10 which in turn has a portion 11 struck out therefrom forming a second leg reversely bent from the leg 10. The sections 10 and 11 forming the legs are bent downwardly so that the lower edges thereof will be in a plane with the lower edge of the base section 2. Thus, the lower edge of the base section 2 together with the leg members 10 and 11 will brace the holder and prevent the same from falling. Due to the vertical position of the base 2 the lower edge thereof will embed itself in the grass of the lawn and prevent the holder from rotating or changing its position while water is passing through the hose.

To strengthen the holder and to finish the edges thereof the same may be provided with beads 12 along its outer edges and the edges of the leg members. The beads may be of an ornamental character so as to enhance the appearance of the holder.

From the foregoing description taken in connection with the accompanying drawings, it will be seen that the present invention provides a hose holder of novel construction which is adapted to be quickly and easily placed on the lawn for holding the nozzle of the watering hose in any desired position in order to effectively sprinkle the lawn adjacent the holder. The holder is of such design that it may be readily removed from the nozzle and conveniently carried from place to place and positioned in a self-supporting manner. The holder also has the advantage of being of such construction as to withstand the hard usage ordinarily imparted to garden appliances of this character. By the provision of a holder of this kind a lawn may be sprinkled without the use of expensive devices necessitating the removal of the nozzle and attachment of the hose thereto in order to effect the operation thereof. The holder also eliminates the necessity of connecting such devices, which often results in leaky connections due to the loss of gaskets and poor connections.

While I have shown and described the holder in detail I do not wish to be limited to the exact construction disclosed in the drawings as it will be understood that minor changes may be made therein without departing from the spirit and scope of the invention as claimed.

What is claimed is:

1. A hose holder made from a single piece of sheet metal comprising a substantially triangular base section arranged vertical and which base section is formed with struck-out portions serving as legs to hold the holder in a substantially vertical position, an elongated portion forming an extension of said base section provided with vertically spaced apertures therein, and a laterally directed portion formed with the upper end of said elongated portion which is also provided with an opening, said openings serving to hold the nozzle of a hose and to support the same in various angular positions with respect to the holder.

2. A one-piece hose holder made from a single piece of sheet metal and comprising an enlarged base section having portions struck-out therefrom providing leg members for said holder, an elongated extension formed with said base section provided with a plurality of openings for the reception of a nozzle carried by the end of a hose adapted to be supported by said holder, and a laterally offset portion formed with the upper end of said extension also provided with an opening for the support of said nozzle.

3. A one-piece hose holder made from a single piece of sheet metal and comprising an enlarged base section having portions struck-out therefrom providing leg members for said holder, an elongated extension formed with said base section provided with a plurality of openings for the reception of a nozzle carried by the end of a hose adapted to be supported by said holder, a laterally offset portion formed with the upper end of said extension also provided with an opening for the support of said nozzle, and means for reinforcing the holder at its edges.

In testimony whereof I affix my signature.

KILBY FARRAR.